United States Patent [19]
Kleine-Horst

[11] 3,986,275
[45] Oct. 19, 1976

[54] APPARATUS FOR SELF-INSTRUCTION

[76] Inventor: Lothar Kleine-Horst, Machabaerstrasse 3, 5 Cologne, Germany, 5

[22] Filed: May 28, 1975

[21] Appl. No.: 581,547

[30] Foreign Application Priority Data
May 31, 1974   Germany............................ 2426524
Apr. 24, 1975   Germany............................ 2518177

[52] U.S. Cl. ............................. 35/9 R; 273/148 A
[51] Int. Cl.² ........................................... G09B 3/06
[58] Field of Search ...................... 35/9 R, 31 G, 28; 273/148 A, 149 P

[56] References Cited
UNITED STATES PATENTS

| | | | |
|---|---|---|---|
| 1,155,523 | 10/1915 | Smith................................ | 35/28 X |
| 1,528,061 | 3/1925 | Joyce................................ | 35/31 G X |
| 1,533,880 | 4/1925 | Malwitz ........................... | 273/148 A |
| 1,538,803 | 5/1925 | Harris ............................... | 273/148 A |
| 1,659,588 | 2/1928 | Balmforth........................ | 273/148 A |
| 3,206,872 | 9/1965 | Nason et al....................... | 35/31 G |
| 3,548,517 | 12/1970 | Penraat et al.................... | 35/9 R |

FOREIGN PATENTS OR APPLICATIONS
140,790    8/1948    Australia............................... 35/73

*Primary Examiner*—William H. Grieb
*Attorney, Agent, or Firm*—P. D. Golrick

[57] ABSTRACT

A series of cards, bearing as learning units as for programmed instruction respective frames of information, questions or problems and answers or solutions, are arranged in like orientation and in ordered sequence in a stacked pack for a preferred embodiment disposed in a stack-form-maintaining container. A perforation margin of each card has a hole corresponding to a correct answer response, or additionally for incorrect responses, a slot or slots coincident with an underlying card hole. The holes or slots are arranged at answer selection locations designated adjacent the perforation margins of the cards, so that withdrawal shiftability or not of an individual exposed top card, by a response selection rod penetrating a margin concealing strip, indicates a correct or a wrong answer; or with the exposed card not withdrawable, by the rod passing through a slot thereof to a hole of an underlying further card, the withdrawability only of the latter enables branching in the instruction program, thus providing a simple, low cost apparatus, convenient for self-instruction and having reuseable frames. Variant simple containers are shown for maintaining the cards in individually removable stacked form and affording a perforation margin covering element; and the cards on one or both sides may each present plural fields of respective frame material.

21 Claims, 8 Drawing Figures

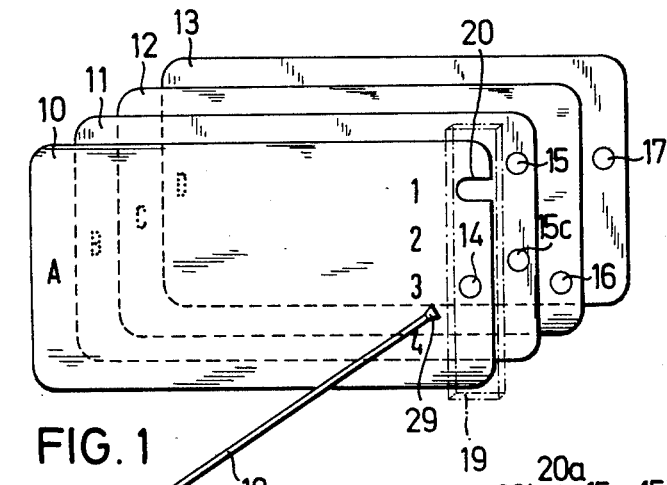
FIG. 1
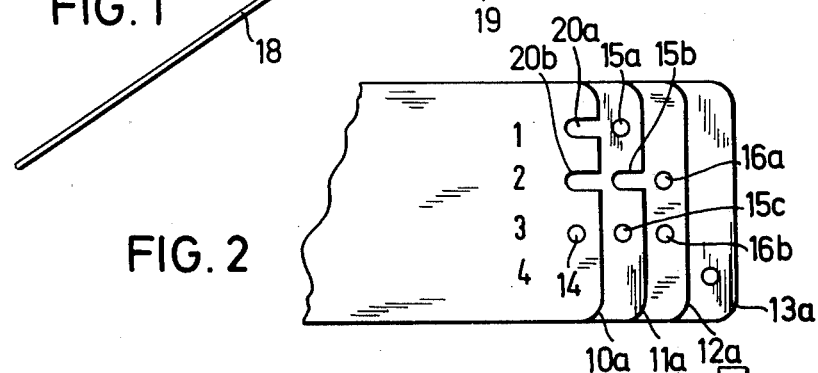
FIG. 2
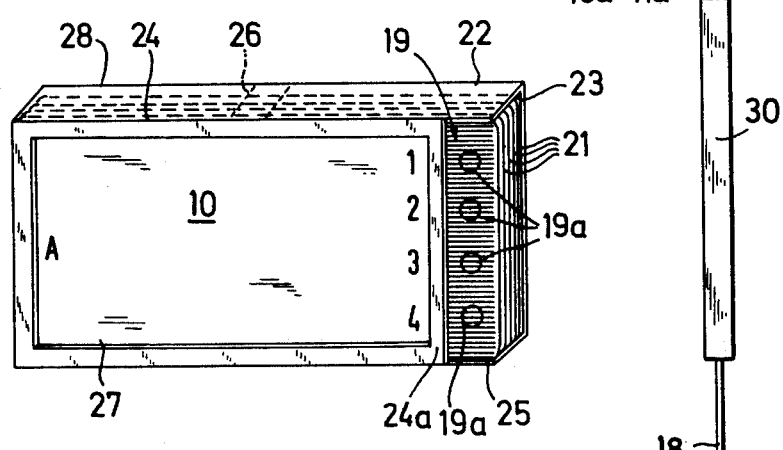
FIG. 3
FIG. 4

APPARATUS FOR SELF-INSTRUCTION

The present invention is concerned with a learning apparatus for self-instruction, presenting to the user-learner a series of learning units generally comprised of information, questions or problems, and respective answers or solutions.

In programmed instruction systems, both linear and branch programs are known in book form. Especially in branched learning programs, the student or learner must page back and forth for particular directions in order to obtain the respectively correct answers or solutions, and so to advance through the programmed material. However, following these directions and the paging back and forth is, for many learners, so complicated that they can not find their way through the branched programs. For uncomplicated presentation of branched programs, electronic type apparatus may be used, but these, of course, are quite expensive.

In the majority of non-electronic type self-contained programmed learning or instruction systems, the very use of the material provided to the learner involves some change in the material itself by way of pencil-marked choice blocks, written-in words or other change in physical conditions of elements bearing frames or units of instruction.

Accordingly the very use entails consupmtion of material, since in great part components presenting the learning units or frames are not suitable for re-use.

The learning apparatus in accordance with the invention not only avoids these disadvantages, but also it offers further positive and specific advantages. A principal object of the invention is therefore to provide a learning apparatus that can present linear and even branched programs in an uncomplicated fashion, and which is nonetheless quite simply constructed and inexpensive for fabrication. Another object is the provision of an apparatus or device of the type described which is particularly adapted for self-instruction. A further object is the provision of an apparatus or device of the type described which is compact and readily portable.

For the attainment of these objects, there is proposed a learning apparatus or device for self-instruction comprising a set or pack or individual independent cards arranged with like orientation in a stack, the cards as a rule carrying information, questions or problems and selectable answers or solutions, representing learning units or "frames"; the cards, on respective like margins here termed "perforation margins", carrying adjacent a direction legend or a correct response legend among plural response legends, a hole for introduction of a response selection rod, so that the cards are withdrawable one after another from the pack stack when engaged by the rod tip in a respective hole; the apparatus including means whereby the perforation margins are concealed from view, which means is non-transparent but is penetratable by the rod tip to reach the perforation margin region at the top of the stack. Since the holes correspond to correct responses, the shiftability of a card from the stack when thus engaged indicates to the user the correctness of the elected response.

The cards are arranged in, disposed in an appropriate holder to facilitate the learning manipulation and reading, and by certain features are rendered readily reuseable in contrast to the materials of various non-machine previous systems, where extensive material consumption often is entailed by use.

The apparatus advantageously affords a system which is "self-contained", that is, does not require other supplies for its use.

A device or apparatus as herein described in especially advantageous in learning games for children, or a learning aid for students and above all as an instructional aid or advertizing device for advertizing agencies, sales agencies and like personnel.

Further particular details or modes of carrying out the invention are presented hereinafter in detail.

Other objects and advantages of the invention will appear from the following description and the drawings wherein:

FIG. 1 is a somewhat schematic and perspective view of merely four cards depicted in spaced relation for clarity, but intended to represent a stack of numerous cards of the type embodied in the device in accordance with the invention;

FIG. 2 is a schematic view somewhat similar to FIG. 1 showing further hole and slot combinations in perforation margins of the cards;

FIG. 3 is a perspective view of a learning device including a first form of container in which a set of numerous stacked cards is inserted;

FIG. 4 is a side elevational view of a container with a yet attached integrally molded response selection rod of a form modified from that of FIG. 1;

GENERAL DESCRIPTION

Figure 5:
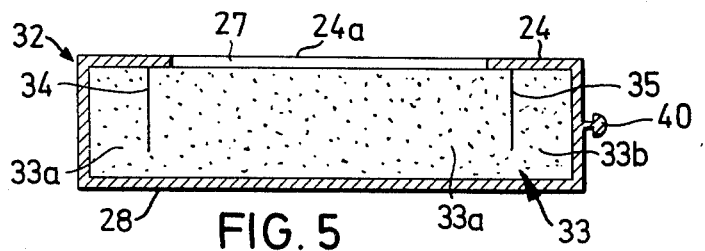
FIG. 5 is a cross section through a device or apparatus of the invention, modified from that of FIG. 3 principally in the use of a card-biasing highly elastic compressible material block emplaced in a housing and therewith forming a stack container, the card stack being absent.

FIG. 1 of the drawings in schematic form, taken in conjunction with FIG. 2, outlines the basic relations for principal elements, in accordance with the invention, of the apparatus or device for a self-instruction system, e.g., by a programmed system; while the remaining figures depict elaborations or modifications of apparatus elements.

Basically the apparatus or device comprises numerous smooth-surfaced, thin plate-like elements of a preferred round-cornered rectangular form, here termed "cards", held in an ordered stack, represented in FIG. 1 by merely four cards 10, 11, 12 and 13 and in FIG. 2 by the four cards 10a–13a; shield means 19 for concealing a perforation margin of each card presented to the user at the top of the stack; and response selection means comprising a stylus-like card transport rod 18 for manipulating withdrawal of the cards of the stack in consequence of car engagement. Also means for restraining non-engaged cards in the stack must be present; being in the simplest form, say a rubber band about a card pack middle, which also serves as means to keep the card set aligned as a stack.

The plate-like elements of the stack are here called "cards" irrespective of thickness, particular shape, or the material of which constituted, whether cardboard, plastic, metal or perhaps even wood.

Each card bears and presents to the learner-user, some learning unit material, conveniently termed a "frame", including information-, question-, or problem-legend material represented by the respective letters "A", "B", "C", "D", etc., imprinted on its front or viewable top face; and for example, on the right hand narrow end allocated for response purposes, electable possible answer or solution response legends including associated elected response designation legends, represented by the vertical series of numerals "1", "2", "3", "4", with the margin between these numerals and the card edge being perforated with at least one hole adjacent the desigation numeral for a respectively correct answer, or a direction legend. Such a margin is herein designated a "perforation margin" of a card.

Additionally, (see also FIG. 2), in some instances, adjacent respective possible response legends there may be slots running into the perforation margin from the edge or plural holes for use as hereinafter explained. It is to be noted also that at least some of the adjacent cards in the ordered stack have holes offset from alignment with one another.

Thus a card is withdrawable from the stack by rightward letters stroke motion of a stylus-like rod 18, serving as a response selection implement with tip entering in, and engaging with the edge of, a respective hole, whereby the card may be moved out of the stack to the right; but a card having a slot entered by the rod remains in the stack, quite as well as if the rod encountered, at a wrong choice location, only the smooth card surface.

Moveability or not of the top card then generally informs the user of the correctness or not of his response.

In combination with the stack, at dashed outline 19, further is indicated a perforation margin concealing means, which is non-transparent, so that the presence or absence or holes or slots adjacent the respective possible answer legends be not observable by the user, but which is easily penetratable by the end of the card manipulating element or response selection rod 18, to reach the plane of the perforation margin region.

As means for concealing card perforation margins, rather than using over the margin of each card say a covering strip which is easily penetratable and, where a slot occurs, is readily torn by the rod stroke to let the rod end escape through the slot without shifting the card, and expedient useable whether or not the stack is maintained by a more or less rigid container; when the stack is received in a rigid container, a single permanent shield or concealing strip may be fixed on the container, which allows access by the transport rod to the perforation margin, for example, a flat hair or bristle strip or a comb-like structure of small elastically bendable teeth with slightly overlapping longitudinal edges.

Thus maintaining the stack by a rigid box-like stucture rather than by a containing band, such as a rubber band or the like, affords the advantage that a single permanent element 19 can be utilized, so that consumption by use is absent apart from wear, whereas with the concealment means on the card itself, though the card plate, hence frame material as a whole, would be preserved, the covering strip would have to be replaced, e.g., a thin opaque paper pressure sensitive adhesive strip, easily removed after use and replaced by a new like covering strip.

Also for the apparatus combination, the card manipulating and shifting implement may be a simple, thin stiff, stylus-like response selection rod 18, e.g., of metal, plastic, wood. But also the tip may be thickened or otherwise shaped for more secure engagement with a card hole edge, for example, by an expanding taper to the very end face in the truncated conical tip 29 in FIG. 1, which does not readily escape or slip out once engaged against the hole edge. Or as in FIG. 4, the rod 30 may have somewhat lens-like thickened end 31 hookable onto the card hole edge, but nonetheless disengageable without difficulty.

Moreover, whre the means for maintaining the stack alignment is a box-like container, and this is preferably made of a plastic, especially by injection molding or other suitable plastic fabrication, the rod can be formed, integrally with the container, as in FIG. 4, where the integral rod 30 may be simply broken off from container 32 for and at the time of use. Or it may be a stubby element, similarly integrally formed with the container, such as the element 40 in FIGS. 5–7, where there results a relatively small card-engaging pin projecting from an enlargement affording a finger grip, when 40 is snapped off from the container. The term "response selection rod" is intended to embrace such variants.

To avoid confusion in the drawings, the response selection designation legends "1" to "4" are shown only on the top card in FIGS. 1 and 2, though it is to be understood that analogous cards will have a plurality of such legends, more or less in number, depending upon the number of possible responses offered to the learner in a particular frame. In some instances, a card may have a single hole adjacent a legend instructing selection of that response position to withdraw the card for exposure either of continuation material on the next card or, after writing an answer, exposure of say an exemplary answer on the next card.

In reference to frames or legend material "imprinted" thereon, it is to be understood that any mode of sensible representation is intended, e.g., printing, embossing, Braille, photographic or other form, whereby a learning unit is presented to the user.

The form of the perforation margins, that is, their contents of holes or holes and slots, and manner of use will be discussed after consideration of FIGS. 3–8.

FIG. 3

In FIG. 3, for the retention of a stack of cards in neatly superimposed relation and for convenience in use as well as portability of the device, there is provided a box-like container 22 made of appropriate material, such as formed and stamped metal elements, integrally or separately molded and assembled plastic elements even made of cardboard or other similar materials, fabricated in various manners appropriate to the material characteristics.

The box 22, of course, has rectangular shape corresponding to the shape of the cards to be received therein, and depth appropriate for the stack thickness to be accommodated. Its size preferably is such that it may be held in one hand or at least held steady in use on a support by one hand, here and in other figures.

The right end of the box is open at 23, for insertion of the stack and withdrawal of the cards 21 individually or in certain groups under possible branched program conditions. The right end margin of the front or operating face 24 has, adjacent end opening 23, a cutout or face slot opening 25, over the region where the perforation margins of the cards will occur, which is overlain by the aforedescribed rod-penetratable concealing element 19. The latter, to facilitate penetration precisely at appropriate places, has dyed or painted spots or circles as at 19a marked thereon over the possible locations of slots or holes in underlying cards.

At least one, but if desired both, of the front and back sides 24 and 28 of the box may have a viewing window 27 through which the question or problem legends, and the solution or answer choice legends constituting the frame of the top card of the stack are readily visible and readable, such as legends "A" and "1" to "4". This viewing window is provided either by transparency of corresponding box wall material or, as here shown, by a simple window cutout at 27, leaving at the right of the window a margin strip 24a, on which the left edge of element 19 is secured with the bristles, hair or teeth extending to the right over opening 25. Especially where there is but the single window, it is advantageous to include resilient means biasing the stack toward that window as discussed relative to FIGS. 5–7, since convenient finger access through the window of the side reverse to that in use is not available for that purpose.

If desired for particular situations, the opposite narrow longitudinal walls of the box may be provided with grooves to receive the longitudinal edges of the respective cards holding them in spaced relation, though this is not necessary by other expedients.

Frictional engagement of the long card edges with the opposed narrow longitudinal box walls in conjunction with the relatively smooth faces of the adjacent cards, whereby only a card or cards positvely engaged by the rod can be readily removed, leaving other cards in the box, is obtainable simply by making the dimension between the opposed narrow walls slightly narrower than the width of the cards; or the material of these walls and the container, at least on the inner face may be such as to have an increased frictional coefficient with respect to the card edges. But as indicated in FIG. 3, more simply there may be provided, on the inner side of at least one of these narrow walls, a friction strip 26 of gum rubber or like material, which spans the longitudiinal edges of the several cards at that side of the stack through the thickness of the stack. The element 26 may have ribbing over its length running transversely to the card edges to increase its effectiveness.

FIGS. 5–7

Figure 6:
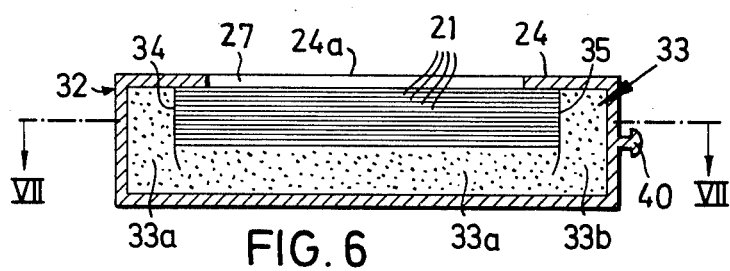
FIG. 6 is a transverse section taken at the line VI—VI in FIG. 7 and corresponding to the section of FIG. 5, but with a stacked set of the cards in place.
Figure 7:
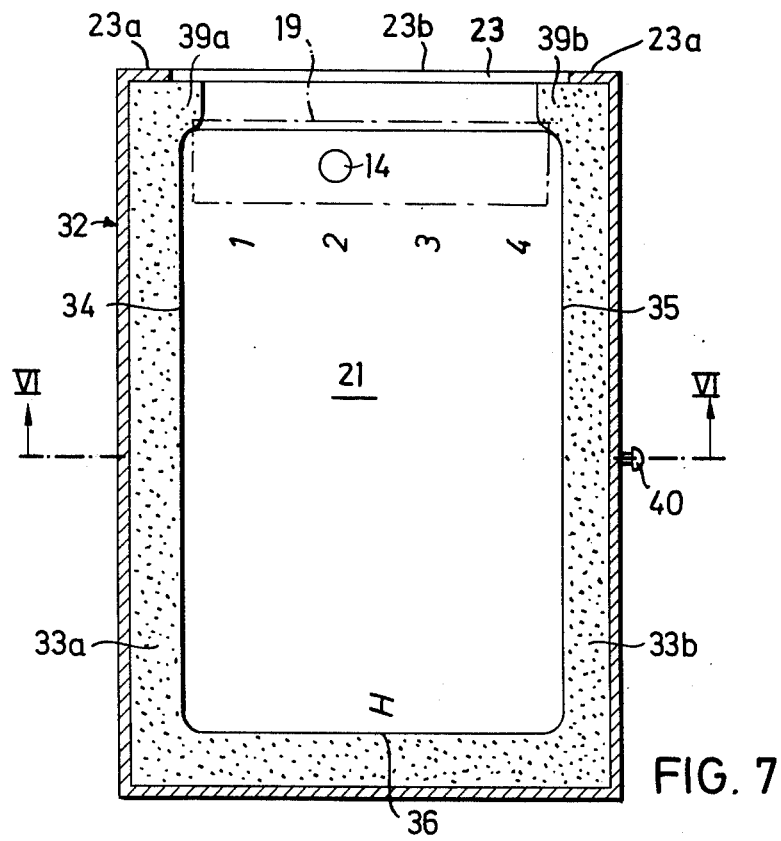
FIG. 7 is a longitudinal horizontal section taken at VII—VII in FIG. 6.

The stack container box form of FIGS. 5–7 is basically similar to that described with respect to FIG. 3. The latter may be considered, in effect and for practical purposes, a front side perspective view of the arrangement of FIGS. 5–7, as to showing principally the presence of a viewing window, the appearance at the window of question and response legends constituting the frame of a respective top card, and the general location of the concealing strip 19 for the card perforation-margins, and presence of an open end for stack insertion and card withdrawal; though some minor differences would arise from certain modifications for accommodation of a card-restraining, pressure-exerting materials as hereinafter described.

In FIGS. 5–7, in effect the container is comprised of a rigid housing or shell 32 with an emplaced insert block element 33 which in effect becomes part of the side, bottom and closed end wall structure of the container since a space, defined by certain incisions into block element, practically speaking defines the card-receiving interior of the container.

For the container of FIGS. 5–7, the housing 32 provides a front or top side 24 with a viewing window; a stack-insertion and card-withdrawal opening 23 in effect defined at the housing end by inward lip-like wall portions 23a, 23a, and 23b, each projecting inwardly respectively from the longitudinal side walls and back wall; the top or front walls 24 lacking such lip to permit top card withdrawal. In this case, in addition to the window main opening 27 of FIG. 3, the top wall has, over the card perforation margin location, a transverse elongated opening intersecting the opening 23 at the open end, and spanned by the penetratable element, the position of which is indicated by the dot-dash outline at 19 in FIG. 7.

In FIGS. 5–7, resilient pressure means biases the stack (absent in FIG. 5) against the viewing window and front wall region and/or presses against the card longitudinal edges, to impede displacement of non-engaged cards and maintain stacked relation with good top card visibility. Although such pressure means can be provided by spring means of a leaf spring, disc spring, or helical compression spring type, here there is lodged in the housing 32 an insert block 33 of compressible and highly elastic material, such as a highly elastic foam rubber, which, when the stack is in place, appears as a liner-like element of the housing. It is to be understood that by the terms "rubber", "foam rubber" and the like, other materials of similar elastic and compressible characteristics are comprehended and are useable.

The block 33, because of its deformable compressible character, is easily insertable either endwise through end opening 23 or from above through the window opening 27, and is retained by housing margin structures forming residual lips about the window opening 27 and the opening 23 of the respective walls.

A stack accommodating space, see FIGS. 6–7) defined between two parallel longitudinal incisions 34–35 and a joining end incision 36 merging therein made partially into the block depth, arises upon downward compression of the freed central part 33a. This space is necked or narrowed by inwardly curved projections 39a, 39b at the withdrawal opening 23; the necking thus further retaining the cards, but by resilient displaceability allowing stack insertion or removal of individual cards. The spacing of the incisions 34, 35, hence residual side parts 33a, 33b is slightly less than the card width.

As clearly appears from FIGS. 6–7, the stack of cards 21 is pressed by 33a upwardly against the front wall and held appropriately centered and clearly displayed in the area beneath the viewing window opening 27; and the longitudinal edges of the individual cards are frictionally engaged by the residual lateral portions 33a, 33b at the region of the longitudinal incisions 34, 35, and upon withdrawal, by 39a, 39b which then all define in effect the inside surfaces of the container longitudinal side walls.

For convenience or variation in mode of fabrication, the two elastic side portions 33a, 33b and the central compressible portions 33a may be comprised of distinct elements with material of the same or somewhat different characteristics. In any case the elasticity of the materials here involved is appropriately chosen for the intended purpose to develop a necessary and sufficient, but not too great, pressure exerted on the cards.

Also, for example, on the bottom wall of FIG. 3 as originally described, there may be affixed a simple pad of the compressible elastic foam material to offer the upward stack-biasing function of the central part 33c, the card longitudinal edges being then otherwise embraced in the manner originally described for FIG. 2, thus omitting the parts corresponding to 33a, 33b.

FIG. 8

Figure 8:
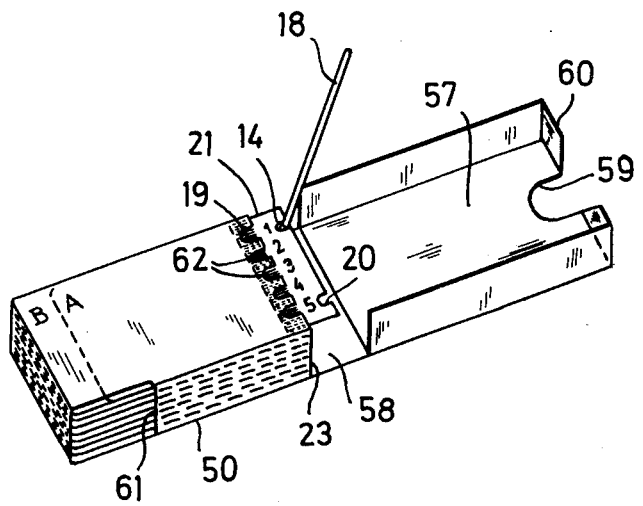
FIG. 8 is a perspective view of a still further form of the device insofar as showing first a modification of the container as such and also in combination therewith a connected receiving tray for cards withdrawn from the stack.

A modification, in the box as such, appears in the container 50 of FIG. 8 for a stack of cards 21, wherein uppermost card 21 is shown partially withdrawn by the rod 18 engaged in the hole 14 adjacent the first response indication legend "1". Here the card happens to show five response choice indication legends "1" to "5" inclusive; and the combination includes a card reception tray 27 to receive each card as it is withdrawn, thereby to avoid the inconvenience, which might otherwise arise with the prior forms, of having to gather individual cards, say from a disordered scattering on a working table surface, and re-assemble them into an aligned pile.

A fingeer gripping opening 59, through the end wall 60 remote from the main container and also the tray bottom wall, facilitates thumb and finger gripping of cards for removal from the tray.

Here again the container may be fabricated of plastic, metal or cardboard material appropriate for the features and the structure described. The entire box may be molded of thin wall transparent plastic material, so that the top wall 24, by its transparency, may itself serve as the viewing window. At the open end 23, for rod tip access to the card perforation margin region, the extreme top wall end margin shows an access formation provided by five slots or notches 62 corresponding to the intended possible positions at which card holes or slots may occur. The wall slots thereby guide rod 18 into any hole or slot present at the selected location. The margin concealing strip 19 of hair or bristles is secured along one edge to the left of the guide notch bottoms; the row of choise selection legends, "1" to "5" inclusive, being so spaced from the card edge that they will be visible at the left edge of the strip 19.

Further at one corner of the box, over the stack thickness or the box height, an aperture 61 enables some restraining pressure to be applied on the card longitudinal edges by fingers of the left hand grasping the container, thereby eliminating special friction elements or size choice expedients for the previously described card restraining purposes.

The slots 62 also guide the end of the selection rod, in its card withdrawing stroke, to move in a substantially straight line parallel to the container walls, thereby minimizing card cocking tendencies, and so facilitating withdrawal of an appropriately engaged card.

Although the tray 57 can be rigidly connected with the main container 50, e.g., where these as a unit are molded of rigid plastic, or fabricated of sheet metal, and it is not desired to fold the tray relative to the main container for any purpose, or in order to avoid hinging, in the preferred FIG. 8 form, the tray is freely swingably connected in hinge-like fashion to the container bottom wall through a connecting portion 58, in effect a continuation of the said bottom wall. With 58 dimensioned as a box end closure, this enables the tray to be folded over as a cap onto the container, when the apparatus is transported or not in use. It also enables the tray to be dropped downwardly to offset the tray bottom sufficiently below the box bottom, e.g., with latter held on a spacing support on a table, so that even the last card may be withdrawn without difficulty or interference from the height of the card accumulation in the tray.

These functions may be conveniently achieved by scoring lines adjacent the end opening 23 and at the mouth of the tray for a container and tray formed of several appropriately folded and glued cardboard elements, or by sufficient flexibility in 58 with approriate choice of materials and methods of fabrication, as known to the arts of paper container manufacture and of plastic fabrication. For a more rigid structure of tray and box, as may be desired with metal or heavy plastic, a pivotal type link connection may be provided by means of simple hinging at those lines.

Also without a permanenet connection to the box, the tray may be sized simply to slide endwise onto or to be placed cap-wise onto the container from top or bottom.

In general, for FIG. 8 use manipulation by the learner are similar to that previously described for other apparatus forms.

With elimination of particular friction characteristics, on the inner walls of or friction means in the container, the form of FIG. 8 is especially adapted for fabrication in a simple and inexpensive form from cardboard by known techinques.

MANIPULATION

Manipulation required for each disclosed form is quite simple. In the case of the simplest possible arrangement, presented by cards without box, the user grasps the cards stacked in the left hand, so that the left hand exerts light lateral pressure on the card long edges thereby holding the cards together aligned in a stack, and also restraining non-engaged cards, which will of course be aided by use of even so little as a rubber band to confine the cards to some degree. With the rod 18 in the right hand, the user-learner proceeds to deal successively with each card which becomes exposed at the top, in accordance with the material presented, drawing out cards by rightward strokes of rod 18, which at ultimately successful elected response points engages cards, until the stack is exhausted.

Where the stack is confined in a box of one of the other figures, the manipulation is essentially identical, but more convenient with the box held in the left hand, since the stack is more secure, and notheing more is required of the left hand beyond grasping the container; and perhaps in one or another form, also applying some light pressure on the cards, e.g., as noted for FIG. 8.

After the end of the stack is reached, the cards are simply re-assembled into proper order for reuse, unless each has in volved a destructible concealing element to fe stripped and replaced. If a given card set incorporates a plurality of programs or extended program by virtue of a plurality of frames on some or all cards as hereinafter discussed, so that the stack is to be worked through again, the cards are put in the appropriate order; and are then inserted into the box or hand-held in the requisite orientation for further use.

Thus for example when the learner has worked his way through the stack to the last card, withdrawal of the last card can represent the completion of a whole program. However, if the cards have been imprinted with a plurality of frame fields, after the learner has worked his way once through the stack, with the cards having been kept in proper order upon withdrawal, or re-sorted into positions, the stack may be reinserted or grasped with appropriate orientation, for example, by turning the entire stack end for end, where opposite ends of the cards serve as perforation margins.

Then the user continues with the other half or "balance" of the program, or in the cases where several fields are present, perhaps with at least one margin per card having two sets of response features of which an upper set has been used, the stack may be worked through again say using a lower set on the card margin.

Or, for example, if the cards are square, the angular orientation of the stack may be changed to use like features successively on all four edges.

CARD FORMS AND OPERATIONS AVAILABLE

The series sequence of the cards of the stack with respect to one another, and the placement of the holes or holes and slots at specific places are determined through what might be called the "algorithm" of the program, that is, through the plan or purpose of the author of the program, for example, in order to connect specific further information to solutions or answers which are in a certain sense correct and/or in a certain sense false.

Preferably the cards of the particular pack representing a program instruction set are successively numbered through the series or in some other way a proper sequence is identifiable, so that after use, the cards can be again sorted back into a proper stack order; and distinct series of numbers may be used for different ordering, when the card contents are such that for some purpose distinct sequences in the stack would be significant.

The cards may have learning unit material or frames imprinted on the back side as well, in effect doubling the available learning units or frames; with another margin, for example, at the other card end appropriately perforated or slotted, though conceivably by the ingenuity of a programmer one set of holes or slots at one end may serve frames appearing on both sides. Likewise the card faces may be divided into a plurality of frame fields with respective learning units printed thereon, with a corresponding plurality of card margins or portions of single margin lengths serving as the respective perforation margins of the fields.

However, though variations in card format may dictate differences, of the basic card stock shape and of container shape, from those illustrated, the essential organization and the operations available are illustrated by FIGS. 1 and 2 and the detailed consideration which follows.

To explain the stacked, i.e., ordered, pack structure and its function, closer consideration is given to examples of the relations of holes, slots and unperforated portions of the perforation margin (i.e., "unperforated" signifying a margin portion uncut by either a hole or slot) not only with respect to the legend material of the respective card frame, but also with respect to the perforation margin contents which are possible in other cards.

Where the plan of the set requires no more of the learner than to deal with the learning unit of each card successively, and each card is otherwise not functionally related to another, in other words with the set having what may be called a simple linear program, the perforation margins then contain only holes, one or more per card depending upon the number of correct responses offered, as in cards 11, 12, 13 of FIG. 1 and 12a, 13a in FIG. 2, (which figures however involve branching); and the only further requirement is some means, e.g., by imprinted successive alpha numeric or orther identifiers, for re-establishing a proper sequence, first to avoid cards following one upon another with holes at the same positions, and secondly to have the proper sequence of subject matter. Where there is not even that degree of programming, the identifiers only prevent hole coincidence and consequent unwanted simultaneous pulling of more than one card.

In such case, by his response selections, the user tries to engage and withdraw a card at the locations adjacent the response legends, until he has succeeded in selecting the correct answer with correctness of falsity or answer being made known by the removability or not of the card from the stack, and the achievement of or finding of the correct response then removing the mastered learning unit to expose the next.

As the learner-user succeeds in achieving the correct responses, thus engaging the rod in a hole of each successive card, one card after another is simply withdrawn from the stack.

But the ready adaptability of the system device for a branching program as well as linear programming is seen by considering the relations of the perforation margin contents of the cards of FIG. 1 with respect to each other, and of FIG. 2, with respect to each other, it being noted that the cards of FIG. 1 could mediately or immediately follow those of FIG. 2 in a stack.

Thus for example in FIG. 1, the top card 10 can represent a point in the series program for simple branching, whether it be the initial card or a subsequent card.

For in addition to a single hole, by the use of one or a plurality of edge slots described, the rod can pass through the slotted card location into an aligned hole of the card next underneath or perhaps through even a slot of the next card into engagement with the hole of a card still distant in the stack, with consequent extraction of the hole-engaged card for inspection and study, though the card or cards, through slots of which the rod passes, remain stationary in the stack.

Referring to FIG. 1, there are on cards 10, 12, 13 for their solutions "3", "4", and "2" (for the examples, assumed to be correct solutions) respectively adjacent holes 14, 16, 17; while on card 11 at the position for a solution "1" where the slot 20 appears on card 10, there is a corresponding hole 15; and at the position on 11 aligned with the correct solution at "3" on card 10, there is a corresponding hole 15c.

If the correct response "3" is first selected, the rod engages in and passes through hole 14 in the topmost card 10, and thus engages also in hole 15c in card 11, so that both cards are immediately drawn or thrown out of the pack exposing the third card 12. Thus the movability of card 10 upon use of the rod at response 3 tells the user that the answer 3 is correct and since the subject matter of the frame of 10 is therefore supposedly known, ancillary information on card 11 need not be used; and 11 is removed simultaneously with 10, that is, it is skipped from exposure.

On the other hand, if the user strokes the rod at a response location 2 or 4, where there is no hole, the rod slides off the end of card 10 which remains in place. The non-movability of the card by such selections indicates the falsity of the selected answer, and this result is achieved without revealing to the user what in fact is the correct answer, since the hole 14 remains hidden by element 19.

Thus the card 11, actually withdrawn in consequence of the wrong response selection at legend 1 of the top card 10, may bear some instruction respecting the falsely chosen response, and the in-fact-withdrawn card 15 simultaneously the provides addtiional information which facilitates, or provides a cue or instruction for, obtaining or finding the correct response to the question or task A presented on the card 10.

Hence the user-learner has the opportunity once again to think over the card 10 taks or question A and to discover the correct solution or response 3 which is confirmed by the use and movability of the card as above described.

Indeed the hole and slot relation of cards 10–11 in FIG. 1 can be used quite diversely; namely, that response 3 be so totally wrong that both of cards 10, 11 be withdrawn, and the exposed card 12 then in effect be a learning unit presenting more fundamental information or teaching; and response 1 being correct, when chosen results in withdrawal of card 11, which may be such that it immediately calls attention to more advanced material to be perhaps merely read, with a direction then to discard the cards 10 and 12 yet in place, so to reach new material on card 13.

These arrangements of notches especially for branching purposes are further exemplified by fragmentary FIG. 2 where the cards 10a, 11a, 12a are specifically related in or for one point in a program of possible multiple branching. Where, in response to the frame of card 10a, a correct answer 3 is selected, the rod passes through the aligned holes 14, 15c and 16b of the three top cards, so that these three are simultaneously withdrawn, exposing then a new question or problem on the card 13 to be dealt with; an appropriate result, since no further learner consideration of the question or problem A on the first card is required. The legend 4 may in fact be not allocated to a possible response, and hence the adjacent imperforate portion in the margin is without significance; or it may be a false response of such character that the program intends merely that the user return to card 10 to rethink the problem and try again without further information.

But for false (or partially true) responses, 1 and 2, further information may be given on cards 11a, and 12a. Hence in the top problem card 10a, the perforation margin also has slsots 20a and 20b associated with improper or false responses 1 and 2; which are coincident respectively with the hole 15a, and with a correspondingly placed slot 15b in the next card 11a and the aligned hole 16a of card 12a. Hence the cards 11a or 12a are withdrawn respectively in consequence of selection of the false responses 1 and 2. These cards can give information or help specifically directed to the learner's deficiency implicit in the character or falsity of the erroneous selections. Or these cards may carry information otherwise appropriate for teaching or aiding the user again to seek the correct response for the learning unit frame still present on card 10a as the visible top care of the stack. Moreover, if one of responses 1 and 2 is selected so that one of cards 11a and 12a is removed, the other still remains in place available for aiding the user in the event that the other of 1 and 2 is next tried. On the other hand, when the correct response 3 is finally selected, whichever of the cards 11a, 12a, might remains, is then drawn out along with card 10.

As the user applies the rod to a particular place on strip 19 as his response to a card frame, the rod may then make engagement with a hole edge for withdrawing a topmost card singly where the next underlying card has no hole or slot coinciding with the hole of the upper most card; or it may pass through a slot to engagement with a hole of an underlying card, usually in the next card, or possibly to a hole of a card further on in the series, say the third card down, where the card next adjacent the top card has a coincidental slot. Where the response choice location has neither hole nor slot the rod end then merely slides to the right on the card without engagement, the card remaining immobile.

From the above it should be clear that not only linear, but also branch programs are easily accommodated and offered; and advantageously individual subsidiary learning units, subsequent to a card presenting particular learning unit problem which is immediately mastered, are automatically skipped from consideration, since they are simultaneously withdrawn with the problem card or first unit upon an initial selection of the correct answer. But on the other hand, upon selection of an incorrect choice or answer, by the card actually drawn, the user is directed back to the learning unit remaining exposed as the topmost card; this being achieved without requiring any type of costly electrical or electronic circuitry or controls.

Thus the user or learner can be lead stepwise through thought and consideration or reasoning gradually to come to the correct answer or solution. Upon such means likewise the special teaching value of the apparatus is based.

Thus in a simplified fashion this learning device has a considerable advantage in flexibility of use.

I claim:

1. Apparatus for self-instruction of the type utilizing a series of learning unit frames each as a rule comprised of information, questions or problems and respective answers or solutions offered for user selection in response to the frame, the apparatus comprising:
a series of individual cards,
each having a card margin allocated as a perforation margin,
said cards being physically independent of one another and
stacked with like orientation on one another into a pack;
a plurality of the said cards each displaying a respective said frame including a plurality of response legends;
each card having in its perforation margin at least one hole adapted for the introduction of and engagement by the tip of a response selection card-engaging transport rod or stylus;
in said plurality of cards, the said hole of each card corresponding to a correct response or a direction legend and at least some of the holes of adjacent cards being offset from each other; and shield means concealing the perforation margin of each card arriving at the top of the pack comprising
- a non-transparent part, allowing access by a said card-engaging selection rod to the perforation margin of a topmost card at all locations allocated for holes in the card series and then a lateral rod motion toward the card edge on said margin to a point outside the shield means as a response to the frame;

whereby any engaged card may be withdrawn from the top of the stack by lateral motion of the rod engaged in the respective said hole.

2. Apparatus as described in claim 1, wherein
at least one card has more than one said hole in its perforation margin,
- whereby a card having more than one hole is withdrawable from the card pack stack upon selection of any one of a corresponding plurality of correct responses.

3. Apparatus as described in claim 1, wherein
at least one card for program branching in addition to the said hole has in its perforation margin at least one slot opening at the adjacent edge of the card,
ssid hole and any said slot coinciding in position respectively with a hole of, and with a hole or a slot of, a respective underlying card in the pack stack.

4. Apparatus as described in claim 1, including in combinaton, a response selection transport rod having an enlarged end for more securely engaging the circumference of a card hole.

5. Apparatus as described in claim 1, wherein
each card is imprinted on both sides with learning unit frames and has a plurality of the perforation margins referenced to respective frames.

6. Apparatus as described in claim 1, wherein
a question or problem is imprinted on a respective card of the stack and the corresponding answer or solution is imprinted on the respectively next following card;
and wherein each card has only a single hole in the respective perforation margin.

7. Apparatus as described in claim 1, wherein
the pack is held together as a stack unit in a box-like container, and in combination therewith
a tray is provided, at a card-withdrawal end of the container, for reception of the card withdrawn from the stack.

8. Apparatus as described in clain 7, wherein
the card reception tray is hingeably connected to the open end of and at the back side of the container.

9. Apparatus as described in claim 8, wherein the card reception tray is receivable on the container in a nestable relation.

10. Apparatus as described in claim 1, including in combination with the card pack,
a box-like six-sides container surrounding and holding the card pack together as an aligned stack, said container including
a top side part providing a viewing window through which is visible the frame-bearing area of a respective uppermost card of the pack, and
an open side, adjacent the pack end where the perforation margins of the cards occur, for withdrawal and insertion of the cards.

11. Apparatus as described in claim 10, wherein the non-transparent part is comprised of a strip of elongated resiliently deflectable elements secured endwise along one longitudinal margin of the strip to project transversely of the strip in a planar overlapping parallel array,
said strip being secured across the top part of the container overlaying the loction of the perforation margins of the card pack, and with the free ends of the elongated elements adjacent the said open side, whereby the non-transparent part of the shield means is penetratable by a transport rod tip for rod access to a card perforation margin.

12. Apparatus as described in claim 10, wherein
the open side of the container has a constriction formed by a deflectable projection from at least one of two side walls adjacent the open side.

13. Apparatus as described in claim 10, wherein
the said cards have a generally rectangular shape and the container has a corresponding rectangular shape;
the perforation margin is located on a narrow side of each card; and
the stack container has a corresponding narrow side open as an end opening for insertion of the pack stack and for withdrawal of the cards therefrom.

14. Apparatus as described in claim 13, wherein
said container is provided with resilient pressure means pressing against at least one of the three pack stack sides comprised of the bottom side and the two longitudinal sides, any pressing against the bottom side urging the card stack against the viewing window and any pressing against a longitudinal side thereby exerting frictional restraint on the longitudinal edges of the cards.

15. Apparatus as described in claim 14, wherein
the pressure means is comprised of a pad or block of elastically compressible material emplaced in, and reacting on a bottom wall of, the container.

16. Apparatus as described in claim 15, wherein
the elastic material insert is comprised of
a block of foamed rubber-like material
which in its normal condition shape undisturbed by a card stack, substantially fills the container interior,
said block having two parallel spaced vertical longitudinal slits incised from the upper or front side of the block partially through its thickness,
the spacing of the slits from one another being slightly smaller than the width of the cards of the stack,
thereby to define between the slits a stack-urging resilient pad downwardly compressible to define a pack accepting space within the container,
with the longitudinal faces of uncompressed block material lateral of the slits frictionally engaging the cards along their longitudinal edges, and restraining the cards in motion in the withdrawal direction.

17. Apparatus as described in claim 16, wherein
the card withdrawal end opening of the container is slightly constricted through inward necking of the elastic material of the insert block.

18. Apparatus as described in claim 13, wherein
at least one of longitudinal sides of the container has an aperture whereby frictional restraint of the cards is attainable by finger pressure applied through the aperture to the card edges.

19. Apparatus as described in claim 10, wherein
the said shield means is provided by
a series of spaced slots running inward from a top wall edge at the container open end, and located at respective levels allocated for holes and slots in perforation margins of the stacked cards, and a non-transparent part penetratable by a transport rod tip disposed beneath the location of the slots;

said slots of the top wall each affording a guide to direct the selection transport rod tip into or through a card hold or slot occurring therebeneath.

20. Apparatus as described in claim 10, wherein on the inner face side of at least one longitudinal side wall adjacent said open side of the container there is disposed a card-edge-engaging friction strip comprised of an elastomeric material.

21. Apparatus as described in claim 10, wherein the container and the selection transport rod are comprised of molded plastic, with the rod integrally formed with the container as molded and adapted be broken away from the container for use.

* * * * *

UNITED STATES PATENT AND TRADEMARK OFFICE
CERTIFICATE OF CORRECTION

PATENT NO. : 3,986,275
DATED : October 19, 1976
INVENTOR(S) : Lothar Kleine-Horst It is certified that error appears in the above-identified patent and that said Letters Patent are hereby corrected as shown below:

Col. 1, line 27, for "consupmtion" read --comsumption--.

Col. 2, line 64, for "car engagement" read --card engagement--.

Col. 3, line 28, for "letters" read --lateral--;
line 52, for "and" read --an--.

Col. 4, line 16, for "whre" read --where--;
line 61, for "has rectangular" read --has a rectangular--.

Col. 6, line 44, for "space, see" read --space, (see--.

Col. 7, line 28, for "fingeer" read --finger--;
line 46, for "choise" read --choice--.

Col. 8, line 24, for "permanenet" read --permanent--;
line 56, for "notheing" read --nothing--;
line 63, for "in volved" read --involved--;
line 64, for "fe" read --be--.

Col. 10, line 14, for "orther" read --other--.

Col. 11, line 16, for "addtiional" read --additional--;
line 21, for "taks" read --task--;
line 57, for "slsots" read --slots--.

UNITED STATES PATENT AND TRADEMARK OFFICE
CERTIFICATE OF CORRECTION

PATENT NO. : 3,986,275

DATED : October 19, 1976

INVENTOR(S) : Lothar Kleine-Horst

Page 2 of 2

It is certified that error appears in the above-identified patent and that said Letters Patent are hereby corrected as shown below:

Col. 12, line 2, for "care" read --card--.

Col. 13, line 25, Claim 2, for "ssid" read --said--;
line 57, Claim 10, for "six-sides" read --six-sided--.

Col. 14, line 5, Claim 11, for "loction" read --location--.

Signed and Sealed this

Twenty-second Day of February 1977

[SEAL]

Attest:

RUTH C. MASON
*Attesting Officer*

C. MARSHALL DANN
*Commissioner of Patents and Trademarks*